US008828471B2

(12) United States Patent
Shibata et al.

(10) Patent No.: US 8,828,471 B2
(45) Date of Patent: Sep. 9, 2014

(54) METHOD FOR MANUFACTURING SOLID MILK

(75) Inventors: Mitsuho Shibata, Kanagawa (JP); Ikuru Toyoda, Kanagawa (JP); Shunichi Kudo, Kanagawa (JP)

(73) Assignee: Meiji Co., Ltd., Tokyo (JP)

( * ) Notice: Subject to any disclaimer, the term of this patent is extended or adjusted under 35 U.S.C. 154(b) by 254 days.

(21) Appl. No.: 11/631,161

(22) PCT Filed: Jul. 1, 2005

(86) PCT No.: PCT/JP2005/012621
§ 371 (c)(1),
(2), (4) Date: Dec. 29, 2006

(87) PCT Pub. No.: WO2006/004190
PCT Pub. Date: Jan. 12, 2006

(65) Prior Publication Data
US 2008/0292770 A1    Nov. 27, 2008

(30) Foreign Application Priority Data

Jul. 2, 2004   (JP) ................................. 2004-196744

(51) Int. Cl.
*A23C 9/16*    (2006.01)
*A23C 9/18*    (2006.01)

(52) U.S. Cl.
CPC .... *A23C 9/18* (2013.01); *A23C 9/16* (2013.01)
USPC .......................................... 426/588; 426/285

(58) Field of Classification Search
USPC .................................. 426/285, 506, 580, 588
See application file for complete search history.

(56) References Cited

U.S. PATENT DOCUMENTS

2009/0175998 A1*   7/2009   Shibata ......................... 426/588

FOREIGN PATENT DOCUMENTS

| CN | 1233402 A | 3/1999 |
|---|---|---|
| EP | 0 131 485 | 1/1985 |
| EP | 0 998 921 A1 | 5/2000 |
| EP | 1 048 216 A1 | 11/2000 |
| EP | 1048216 A1 | 11/2000 |
| FR | 840.244 | 4/1939 |
| FR | 1.560.810 | 3/1969 |
| FR | 2.012.974 | 3/1970 |
| FR | 2.107.989 | 5/1972 |
| GB | 738755 | 10/1955 |
| GB | 768143 | 2/1957 |
| GB | 894001 | 4/1962 |
| GB | 945977 | 1/1964 |
| GB | 1 286 249 | 8/1972 |
| GB | 2 035 035 A | 6/1980 |
| GB | 2 188 915 A | 10/1987 |
| JP | 45-39018 B1 | 12/1970 |
| JP | 49-4948 B1 | 2/1974 |
| JP | 62-36173 A | 2/1987 |
| JP | H8-291051 | 11/1996 |
| JP | H10-298061 | 11/1998 |
| WO | 2004/023896 A1 | 3/2004 |
| WO | 2004023896 A1 | 3/2004 |

OTHER PUBLICATIONS

M. Kieran Keogh, et al., "Effects of ultrafiltration of whole milk on some properties of spray-dried milk powders", International Dairy Journal, vol. 13, pp. 995-1002, 2003.
E. Berlin, et al., "Effect of water vapor sorption on porosity of dehydrated dairy products", Journal of Dairy Science, vol. 51, No. 5, pp. 668-672, Oct. 2, 1967.
Notice of Opposition of New Zealand Patent Application No. 551836, filed on Dec. 1, 2008.
R. J. de Knegt et al. Improvement of the Drying Oven Method for the Determination of the Moisture Content of Milk Powder, Int. Dairy Journal, 8 (1998), pp. 733-738.
J. J. Fitzpatrick et al. Effect of powder properties and storage conditions on the flowability of milk powders with different fat contents, Journal of Food Engineering, 64 (2004), pp. 435-444.
European Search Report dated Jul. 27, 2010, for Application No. 05757958.3-1221 / 176982.
Pisecky, "Handbook of Milk Powder Manufacture," two cover pages and pp. 166-170 (1997).
"Analytical Methods for Dry Milk Products," 4th Ed., pub. A/S Niro Atomizer, pp. 46-47 (1978).
"Milk Powder Technology Evaporation and Spray Drying ," 5th Ed., pub. A/S Niro, pp. 191, 207, 209, 211 (2004).
Kim, et al., "Surface characterization of four industrial spray-dried dairy products in relation to chemical composition, structure and wetting properties," Colloids and Surfaces B: Biointerfaces, vol. 26, pp. 197-212 (2002).
Buma, "Free fat in spray-dried whole milk. 5. Cohesion: Determination, influence of particle size, moisture content and free-fat subject matter," Net H. Milk Dairy J., vol. 25, pp. 107-122 (1971).
Buma, "Free fat in spray-dried whole milk. 10. A final report with a physical model for free fat in spray-dried milk," Neth. Milk Dairy J., vol. 25, pp. 159-174 (1971).
Roos, "Importance of glass transition and water activity to spray drying and stability of dairy powders," Lait, vol. 82, pp. 475-484 (2002).

(Continued)

*Primary Examiner* — Leslie Wong
(74) *Attorney, Agent, or Firm* — Osha Liang LLP (57) ABSTRACT

The object of the present invention is to provide solid milk having suitable solubility and strength and a method for manufacturing such solid milk.
The present invention is based on the knowledge that solid milk combining sufficient strength with sufficient solubility can be obtained basically by compacting and molding only powdered milk as an ingredient under a condition where porosity and free fat content thereof are controlled within fixed ranges and then humidifying and drying. The above-described object can be attained with solid milk with a porosity of 30% to 50% and a method for manufacturing solid milk, comprising a compacting process for compacting powdered milk and obtaining a solid compacted body of powdered milk, a humidifying process for wetting the compacted body of powdered milk obtained in the compacting process, and a drying process for drying the compacted body of powdered milk humidified in the humidification process.

5 Claims, 4 Drawing Sheets

(56) References Cited

OTHER PUBLICATIONS

Thomas et al., "Milk powder ageing: effect on physical and functional properties," Critical Reviews in Food Science and Nutrition, pp. 297-322 (2004).
Sebhatu et al., "Effects of Moisture Sorption on Tabletting Characteristics of Spray Dried (15% Amorphous) Lactose," Pharmaceutical Research, vol. 11 (9), pp. 1233-1238 (1976).
Clyens et al., "The compaction of some powdered foodstuffs," Int. J. mech. Sci., vol. 18, pp. 449-451 (1976).
Vignolles et al., "Free fat, surface fat and dairy powders: interactions between process and product. A Review," Lait, vol. 87, pp. 187-236 (2007).
Pijanowski et al., "Die Benetzbarkeit von Vollmilchpulver und sien Gehalt an freiem Fett;" Die Nahrung, vol. 18(8), pp. 753-758 (1974).
Buma, "Free fat in spray-dried whole milk. 1. General introduction and brief review of literation," Neth. Milk Dairy J., vol. 25, pp. 33-41 (1971).
Maarten Valk, Declaration, Centre for Specialised Nutrition, May 22, 2012.
Technical Report included results of tests carried out by Eurotab, undated.
Opposition against European patent No. 1 769 682 B1 filed by N.V. Nutricia in the European Patent Office on May 23, 2012.
Notice of Opposition to European patent No. 1 769 682 B1 filed by Eurotab in the European Patent Office on May 22, 2012.

* cited by examiner

METHOD FOR MANUFACTURING SOLID MILK

BACKGROUND OF THE INVENTION

1. Field of the Invention

The present invention relates to solid milk for drinking upon dissolution in warm water and to a method for manufacturing such solid milk. More particularly, the present invention relates to solid milk with suitable solubility and strength, and to a method for manufacturing thereof.

2. Description of the Related Art

Powdered milk is a food product whose storage ability is improved by completely removing water, which is necessary for the growth of microorganisms, from milk. Because volume and weight are reduced when water is removed, the powdered milk is easy to transport. The powdered milk thus has many advantages in terms of storage ability and transportation. Because pores (spaces) are present between the particles in powdered milk, the porosity of powdered milk is generally 60% to 70% and the milk is easily dissolved in warm water. However, when the powdered milk is dissolved in warm water or the like, the appropriate quantity thereof has to be weighed. Furthermore, the powdered milk is sometimes scattered when it is weighed or removed. Accordingly, solid milk obtained by converting the powdered milk into a solid form was suggested (see Japanese Utility Model Laid-open Publication Nos. S49-130189 and S61-118280). However, it is not easy to convert the powdered milk into a solid state and to satisfy the requirements placed on both the strength and the solubility. In other words, even if the powdered milk is converted into a solid state, it is easily fractured and difficult to handle. Furthermore, the solid milk has a surface area less than that of the powdered milk and is, therefore, difficult to dissolve in warm water.

When powdered milk is actually converted into a solid state by applying a pressure, because the powdered milk is an emulsion, the emulsification state is destroyed by the pressure. As a result, a fat oozes from the powdered milk (this fat is called "free fat"). This free fat is easily oxidized and spoils the taste of powdered milk. Furthermore, the problem associated with dissolving the powdered milk in warm water is that the excess free fat floats and agglutinates (this effect is called "oil-off"). On the other hand, Japanese Examined Patent Publication No. S49-4948 discloses, "aggregated powdered milk". Furthermore, it discloses "the aggregated powdered milk has a porous internal structure and, therefore, easily absorbs water. As a result, when placed in warm water, it is easily disintegrated, dispersed, and dissolved". However, the "aggregated powdered milk" described in this reference is a mixture of sugar and glucose and is said, "to be also suitable for use as an additive to coffee and black tea". Thus, it does not use only powdered milk as an ingredient and cannot be employed as a substitute for breast milk for babies. In the Japanese Examined Patent Publication No. S49-4948, the "aggregated powdered milk" was obtained by using a mixture of powdered milk in a granulated state and sugar or glucose because of the problem of free fat arising when only the powdered milk is used as an ingredient. In the case of powdered milk in a granulated state, because the surface area increases by comparison with that in a solidified state, solubility is high despite the fact that the porosity of granules themselves is low.

Japanese Examined Patent Publication No. S45-39018 discloses technology similar to that disclosed in Japanese Examined Patent Publication No. 49-4948. Thus, it discloses that pore volume may be increased to obtain solid milk with good solubility and that a problem of free fat rises when the powdered milk is converted into solid milk. However, the same reference source describes that because "a limitation is placed on the increase in a single particle size of powdered milk" (ibid, second column, line 30), "readily soluble solid milk" is obtained by "causing the adhesion of powdered milk to sugars, granulating, and then molding and drying" (ibid, third column, lines 13 to 15). Thus, this reference also demonstrates that solid milk cannot be obtained by converting only the powdered milk into a solid state.

Japanese Patent Laid-open Publication No. S53-59066 discloses a "solid milk tablet". In this high-density solid milk tablet, fat components leached out to the surface and milk is insulated from the external air with a fat film. The solid milk disclosed in this reference is preferably a high-density tablet and, therefore, the porosity thereof is low.

Japanese Patent No. 3,044,635 discloses, "frozen milk". This frozen milk comprises a large amount of moisture for freezing and has practically no pores.

Solid food products that are dissolved when placed in hot water are known in the field of food products such as soups (Japanese Patent Laid-open Publication Nos. H11-127823, 2004-49220, and 2004-49221). Such products generally comprise a disintegrating agent. Furthermore, because ingredients are not powdered milk, the problem of free fat, which is inherent to powdered milk, is not encountered. Thus, solid soups are known, but if the technology of solid soup manufacture is simply diverted to the manufacture of solid milk, solid milk cannot be obtained because of a large amount of fat present in the powdered milk that is an ingredient for solid milk.

In the field of drugs, a variety of "tablets that rapidly disintegrate in oral cavity" have been disclosed (For example, Japanese Patent Laid-open Publication Nos. H5-271054, 8-291051, 2000-95674, 2000-44463, 2001-89398, and Japanese Patent No. 2,650,493). However, because the weight ratio of effective components in drug compositions is generally low, a large quantity of additives such as excipients can be compounded in addition to the effective components and the compositions are comparatively easy to design. Furthermore, they do not contain a large amount of fat as the powdered milk does. Therefore, the "rapid disintegration" technology employed in "tablets that rapidly disintegrate in oral cavity" cannot be directly diverted to solid milk. Furthermore, the "tablets that rapidly disintegrate in oral cavity" have to be rapidly dissolved with a very small amount of water present in the oral cavity. On the other hand, solid milk is generally drunk after dissolution in warm water and is not taken directly into the mouth. Therefore, rapid solubility of the order necessary for the "tablets that rapidly disintegrate in oral cavity" is not required.

SUMMARY OF THE INVENTION

It is an object of the present invention to provide solid milk having suitable solubility and strength and a method for manufacturing thereof.

It is another object of the present invention to provide solid milk that can be easily handled, e.g., transported, and easily weighed and a method for manufacturing thereof.

It is yet another object of the present invention to provide solid milk with small deterioration with time caused by free fat, such as taste degradation and oil-off, and a method for manufacturing thereof.

It is yet another object of the present invention to provide solid milk that can attain desired component composition by only controlling with nutritional components, and a method for manufacturing thereof.

It is yet another object of the present invention to provide a method for manufacturing of solid milk that makes it possible to manufacture solid milk from powdered milk without using additives such as lubricants.

It is yet another object of the present invention to provide a method for manufacturing solid milk that makes it possible to prevent the powdered milk from sticking to the punch or die of a tablet machine.

It is yet another object of the present invention to provide a method for manufacturing of powdered milk and solid milk that makes it possible to manufacture not only the powdered milk, but also solid milk based on the powdered milk after the powdered milk has been manufactured.

The present invention is based on the knowledge that solid milk combining sufficient strength with sufficient solubility can be obtained basically by compacting and molding only powdered milk as an ingredient under a condition of controlling porosity and free fat content thereof within fixed ranges and then humidifying and drying. At least one of the above-described problems can be resolved by the below-described solid milk and method for manufacturing the solid milk.

[1] Solid milk in accordance with the first aspect of the present invention is solid milk with a porosity of 30% to 50%. As was explained above, attempts to manufacture solid milk have been made since the end of Showa forties. However, the problem is that hard solid milk is difficult to dissolve, whereas solid milk with high solubility is brittle. For this reason, solid milk satisfying the requirements placed on both the hardness and the solubility has not been obtained. The inventors were the first to manufacture solid milk with a porosity of 30% to 50% by controlling the porosity (compacting force) and the amount of free fat in the manufacture of solid milk. Furthermore, the solid milk thus manufactured was both hard and soluble. Because the solid milk in accordance with the present invention has a porosity of 30% to 50%, hardness necessary during manufacture and solubility necessary during use can be obtained.

[2] The solid milk in accordance with another aspect of the present invention is the solid milk according to clause [1], wherein the content ratio of fat is 5 wt % or higher. "The content ratio of fat" means the weight ratio of fat in the entire solid milk. The content ratio of fat of "5 wt % or more" is, more specifically, 5 wt % to 70 wt % and so on, as will be described below.

[3] The solid milk in accordance with another aspect of the present invention is the solid milk according to clause [1], comprising emulsified fat and free fat as fat, wherein the content ratio of the free fat (the weight ratio of the free fat in the entire solid milk) is 0.5 wt % to 4 wt %. As will be described below, the solid milk in accordance with the present invention comprises a substantial amount of free fat, which has heretofore been considered as an undesirable component, thereby making it possible to obtain solid milk having the prescribed pores.

[4] The solid milk in accordance with another aspect of the present invention is the solid milk according to clause [1], wherein the moisture content is 1 wt % to 4 wt %.

[5] The solid milk in accordance with another aspect of the present invention is the solid milk according to clause [1], having a volume of 1 cm$^3$ to 50 cm$^3$. Because the solid milk in accordance with the present invention is solid, it has a volume larger than that of the conventional powdered milk, the desired quantity thereof can be easily weighed, and such milk can be conveniently transported.

[6] The solid milk in accordance with another aspect of the present invention is the solid milk according to clause [1], wherein powdered milk is used as an ingredient and the solid milk has homogeneous composition. Because the prescribed powdered milk comprising free fat is used as an ingredient, a solid milk composed only of powdered milk can be manufactured, though sugar-based nuclei are not formed.

[7] The solid milk in accordance with another aspect of the present invention is the solid milk according to clause [1], wherein only powdered milk is used as an ingredient. If only powdered milk is used as an ingredient, solid milk of homogeneous composition can be easily obtained.

[8] The solid milk in accordance with another aspect of the present invention is the solid milk according to clause [1], wherein, when a piece of solid milk is placed in 100 mL of water at 50° C. and shaken at a rate of 1.5 cycles/sec and an amplitude of 30 cm, a time of 5 sec to 180 sec is required to dissolve the solid milk completely. Because the solid milk in accordance with the present invention has the prescribed porosity, it can be rapidly dissolved and can satisfy market requirements on commercial products.

[9] The solid milk in accordance with another aspect of the present invention is the solid milk according to clause [1], wherein a force causing fracture when a load is applied in the direction in which the surface area of the fracture surface of a sample becomes minimal is 30 N to 300 N. Because the solid milk in accordance with the present invention has a certain hardness, it can be prevented to a certain degree from fracture during transportation. The solid milk in accordance with another aspect of the present invention is a solid milk that has a porosity of 30% to 50%, a fat content ratio of 5 wt % to 70 wt %, a free fat content ratio of 0.5 wt % to 4 wt % based on the entire solid milk, a water content ratio of 1 wt % to 4 wt %, and a volume of 1 cm$^3$ to 50 cm$^3$ and uses only powdered milk as an ingredient. The solid milk employing such features has high solubility described in clause [8] and the above-described hardness.

[10] A method for manufacturing solid milk in accordance with another aspect of the present invention comprises a compacting process for compacting powdered milk and obtaining a solid compacted body of powdered milk, a humidifying process for wetting the compacted body of powdered milk obtained in the compacting process, and a drying process for drying the compacted body of powdered milk humidified in the humidification process.

[11] The method for manufacturing solid milk in accordance with another aspect of the present invention is the method for manufacturing solid milk according to clause [10], wherein substantially no additives are added to the ingredient in the compacting process.

[12] The method for manufacturing solid milk in accordance with another aspect of the present invention is the method for manufacturing solid milk according to clause [10], wherein powdered milk with a fat content ratio of 5 wt % or higher is used in the compacting process.

[13] The method for manufacturing solid milk in accordance with another aspect of the present invention is the method for manufacturing solid milk according to clause [10], wherein the content ratio of free fat in the compacted body of powdered milk is 0.5 wt % to 4 wt %. The method for manufacturing solid milk in accordance the present invention uses a substantial amount of free fat, which has heretofore been considered as an undesirable component, thereby making it possible to obtain solid milk having the prescribed pores.

[14] The method for manufacturing solid milk in accordance with another aspect of the present invention is the method for manufacturing solid milk according to clause [10], wherein the compacting force is controlled in the compacting process so that the porosity of the compacted body of powdered milk becomes 30% to 50%.

[15] The method for manufacturing solid milk in accordance with another aspect of the present invention is the method for manufacturing solid milk according to clause [10], wherein the compacting force for compacting the powdered milk in the compacting process is 1 MPa to 15 MPa.

[16] The method for manufacturing solid milk in accordance with another aspect of the present invention is the method for manufacturing solid milk according to clause [10], wherein the amount of moisture added to the compacted body of powdered milk in the humidifying process is 0.5% to 3% the weight of the compacted body of powdered milk after the compacting process.

[17] The method for manufacturing solid milk in accordance with another aspect of the present invention is the method for manufacturing solid milk according to clause [10], wherein in the drying process, the moisture content ratio of the solid milk is controlled to be no more than 1% higher or lower than the moisture content ratio of the powdered milk used as the ingredient.

In the present specification, the term "porosity" means the ratio of pore volume in the bulk volume of a powder (for example, see Miyajima Koichiro, Ed., Development of Drugs (Vol. 15), published by Hirogawa Shoten (1989), p. 240), more specifically a value measured by the method for "Measuring Porosity of Solid Milk" in the below-described test example.

In the present specification, the term "powdered milk" means a modified milk obtained by mixing fat-soluble components such as milk fat and vegetable fat with water-soluble components such as water, sugars, proteins (including peptides and amino acids), and minerals, and drying to obtain a powder. Examples of powdered milk include whole powdered milk, modified powdered milk, and creamy powder.

In the present specification the term "solid milk" means milk modified to be in a solid state at normal temperature. More specifically solid milk means milk obtained by molding powdered milk to the prescribed size and weight, this milk forming the same solution in water as the powdered milk.

In the present specification, the term "homogeneous composition" means that solid milk has substantially the same composition in all the portions thereof. "Homogeneous composition" is also assumed when compaction molding is conducted after adding and mixing components that are not employed with the object of solidification or providing solubility. However, the state in which powdered milk with a small particle size adheres to sugar with a large particle size serving as nuclei, as described in Japanese Examined Patent Publication Nos. S49-4948 and S45-39018, is not considered as a state with "homogeneous composition". On the other hand, when a coating layer is provided on the surface after the solid milk has been manufactured, the inside of the coating layer is solid milk and this solid milk is assumed to have "homogeneous composition".

In the present specification, the term "additive" means agents other than nutritional components, for example, a binding agent, a disintegrating agent, a lubricant, and an expanding agent.

In the present specification the expression "substantially no additives are added" means that basically only powdered milk is used as an ingredient and relates to the case where the additives are added in an amount producing no effect on nutritional components of solid milk, for example, in an amount of 0.5 wt % or less (preferably 0.1 wt % or less). Furthermore, in accordance with the present invention, it is preferred that only powdered milk be used as an ingredient and that additives other than powdered milk be not used.

The present invention provides solid milk imparted with good solubility and strength by controlling the porosity of the solid milk and to a method for the manufacture thereof.

The present invention can provide solid milk with the prescribed shape and size. Therefore, solid milk that can be easily handled, e.g., transported, and weighed and a method for manufacturing such milk can be provided.

In accordance with the present invention, free fat that has been considered the cause of taste degradation caused by oxidation and deterioration of fat during storage of powdered milk is intentionally produced within a range causing not problems. Effectively employing the free fat as a lubricant or the like makes it possible to provide solid milk with small deterioration with time caused by free fat and a method for manufacturing such solid milk, without adding any additives.

In accordance with the present invention, powdered milk is directly converted into solid milk. Therefore, controlling the composition of the powdered milk itself makes it possible to provide solid milk enabling the control of the ingredient composition of the solid milk only with nutritional components and a method for manufacturing such solid milk.

The present invention can provide a method for manufacturing solid milk with high productivity in which the powdered milk is prevented from sticking to the punch or die of the tableting machine by controlling the free fat ratio of the powdered milk and the porosity and moisture content of the powdered milk (in particular, free fat ratio) in the compacting process.

As described above, in accordance with the present invention, free fat can be effectively employed as an additive. Therefore, a method for manufacturing solid milk can be provided, this method enabling the direct production of solid milk, without adding any additives such as lubricants to the powdered milk.

The present invention also provides a method for manufacturing powdered milk and solid milk, this method making it possible to manufacture not only the powdered milk but also solid milk based on the powdered milk after the powdered milk has been manufactured.

DESCRIPTION OF THE PREFERRED EMBODIMENTS

1. Solid Milk

The solid milk in accordance with the present invention is solid milk with a porosity of 30% to 50%. The higher the porosity becomes, the higher the solubility becomes, but the lower the strength becomes. Furthermore, if the porosity is small, solubility decreases. The porosity is mainly controlled by the compacting force in the compacting process. Furthermore, in accordance with the present invention, the preferred porosity is 35% to 50%, but the porosity may be adjusted according to the application of the solid milk and may be 30% to 35%, 30% to 45%, 40% to 45%, or 40% to 50%. As described below, if the porosity is within those ranges, good solid milk free from problems of oil-off or the like can be obtained.

It is preferred that a plurality of individual pores be present in the solid milk. The pores are preferably dispersed uniformly in the solid milk. Because the pores are almost uniformly distributed in the solid milk, a higher solubility can be obtained. The larger are the pores, the easier water penetrates therein and a high solubility can be obtained. On the other hand, if the pore size is too large, strength decreases or the surface of solid milk becomes rough. Accordingly, the pore size is, for example, 10 μm to 500 μm, preferably 50 μm to 300 μm. Such pore size can be measured by well-known means, for example, by observing the surface and cross section of solid milk with a scanning electron microscope.

The components of solid milk are basically identical to those of powdered milk serving as an ingredient therefor, with the exception of the amount of water. Examples of solid milk components include fats, sugars, proteins, minerals, and water.

The content ratio of fat in the solid milk is, for example, 5 wt % to 70 wt %, preferably 5 wt % to 50 wt %, even more preferably 10 wt % to 45 wt %.

The solid milk in accordance with the present invention may contain emulsified fat or free fat as fat. Thus, in the conventional powdered milk or solid milk, problems were associated with the free fat spoiling the taste and floating on the water (oil-off) when the milk was dissolved in warm water and, therefore, the free fat was actively removed. It is preferred that the solid milk in accordance with the present invention proactively contain the free fat. This free fat is effectively employed in place of a lubricant and the like. As a result, the present invention makes it possible to manufacture good solid milk, without using additives. However, if the amount of free fat is too high, it raises the oil-off problem. Accordingly, the content ratio of free fat in the solid milk in accordance with the present invention is, for example, 0.5 wt % to 4 wt %, preferably 0.7 wt % to 3 wt %, more preferably 1 wt % to 2.5 wt %. This is because if the content ratio of free fat is within those ranges, good hardness and solubility are obtained and excess oil-off is inhibited, as will be shown in the below-described embodiments. Furthermore, the amount of free fat at which oil-off becomes a problem differs depending on the fat composition and physical properties such as fat globule diameter in the powdered milk used as an ingredient. Therefore, the amount of free fat contained in the solid milk may be appropriately corrected within the above-described ranges.

If the moisture content in solid milk is high, stability in storage is degraded, and if the moisture content is low, the solid milk becomes brittle. Therefore, the content ratio of moisture in the solid milk is, for example, 1 wt % to 4 wt %, preferably 2 wt % to 3.5 wt %.

The shape of the solid milk in accordance with the present invention is not limited, provided it has a certain size. Thus, the solid milk may have the shape of round rods, elliptical rods, rectangular parallelepipeds, cubes, plate, balls, polygonal rods, polygonal cones, polygonal pyramids, and polyhedrons. From the standpoint of convenience of handling, the shape of round rods or tetragonal rods is preferred. Furthermore, in order to prevent the solid milk from fracturing, it is preferred that the corner portions be rounded.

It is preferred that one piece or several pieces (preferably, one piece) of the solid milk in accordance with the present invention produce one serving for drinking when dissolved in warm water. Therefore, the volume of the solid milk is, for example, 1 cm$^3$ to 50 cm$^3$, preferably 2 cm$^3$ to 30 cm$^3$, more preferably 4 cm$^3$ to 20 cm$^3$.

The solid milk in accordance with the present invention has to have certain solubility. The solid milk in accordance with the present invention, for example, has solubility of 180 sec or less, preferably 120 sec or less, more preferably 60 sec or less under the below-described solubility measurement conditions. However, if the time is too short homogeneous liquid cannot be obtained. Therefore, it is preferred that the solubility be 5 sec or more.

The solid milk in accordance with the present invention has to have a certain strength to prevent it from fracturing during transportation. The solid milk in accordance with the present invention preferably has a hardness of 30 N or higher under the below-described tablet hardness measurement conditions. On the other hand, from the standpoint of solubility, the solid milk with hardness of 300 N or less is preferred.

2. Manufacturing Process

A method for manufacturing the solid milk in accordance with the present invention comprises a compacting process for compacting powdered milk and obtaining a solid compacted body of the powdered milk, a humidification process for humidifying the compacted body of powdered milk obtained in the compacting process, and a drying process for drying the compacted body of powdered milk obtained in the humidification process.

2.1. Compacting Process

The compacting process is the process for compacting powdered milk and obtaining a solid compacted body of the powdered milk. In the compacting process, a compacted body of the powdered milk maintaining pores for water permeation is obtained by tableting the powdered milk under a comparatively low pressure sufficient for transferring the powdered milk to the next process. In the compacting process, the powdered milk is compacted so as to satisfy the condition of manufacturing a compacted body of powdered milk that is provided with adequate pores and has a shape retaining ability. Thus, the porosity in the compacting process is directly related to the porosity of solid milk. Furthermore, poor lubricating ability of the compacted body of powdered milk can cause troubles in making tablets, such as the adhesion of part of the compacted body of powdered milk to the equipment such as a tablet machine. Moreover, a problem associated with poor shape retaining ability of the compacted body of powdered milk is that it will not retain its shape in the process of manufacturing the solid milk.

It is preferred that only powdered milk be used as an ingredient in the compacting process and substantially no additives are added. A commercial powdered milk can be purchased or it may be manufactured by well-known manufacturing methods (for example, manufacturing methods described in Japanese Patent Laid-open Publication Nos. H10-262553, H11-178506, 2000-41576, 2001-128615, 2003-180244, and 2003-245039). Examples of powdered milk compositions are the same as those of the above-described solid milk. A fat may be added to the ingredient of the compacting process. However, if a fat is added, this fat becomes an oil-off base. Furthermore, because the fat added to the milk adheres to the powdered milk surface, the die filling accuracy is decreased. Therefore, powdered milk manufactured so as to contain the target quantity of free fat is preferably used in the compacting process.

When the content ratio of fat in the powdered milk is high, a small compacting force can be used. On the other hand, when the content ratio of fat in the powdered milk is small, the compacting force has to be increased. Therefore, using powdered milk with a high content ratio of fat makes it possible to satisfy the condition of manufacturing a compacted body of powdered milk that is provided with adequate pores and has a shape retaining ability. From this standpoint, the content ratio of fat in the powdered milk can be, for example, 5 wt % to 70 wt %, preferably 5 wt % to 50 wt %, more preferably 10 wt % to 45 wt %.

As mentioned above, the powdered milk preferably contains free fat. In accordance with the present invention, this free fat is effectively employed in place of a lubricant and so on. As a result, good solid milk can be manufactured without adding any additive. In the solid milk in accordance with the present invention, the content ratio of free fat is, for example, 0.5 wt % to 3 wt %, preferably 0.7 wt % to 2.4 wt %, more preferably 1 wt % to 2 wt %.

If the moisture content of the powdered milk is high, shape-retaining ability is degraded, and if the moisture content is low, the powdered milk becomes brittle (shape retaining ability is degraded). Accordingly, the moisture content ratio in the powdered milk is, for example, 1 wt % to 4 wt %, preferably 2 wt % to 3.5 wt %.

In the compacting process, the compacted body of powdered milk is manufactured with compacting means for compacting the powdered milk and obtaining a solid compacted body of powdered milk. The compacting means is not limited, provided that it can compact powdered milk and produce a solid compacted body of the powdered milk. Well-known pressure molding machines such as a tablet machine and a compacting testing machine can be used as the compacting means, and among them the tablet machine is preferred. Examples of suitable tablet machines are described in Japanese Examined Patent Publication No. S33-9237, Japanese Patent Laid-open Publication Nos. S53-59066, H6-218028, and 2000-95674, and Japanese Patent No. 2650493.

When a powdered material is compacted by using a tablet machine, the powdered material is introduced into a die, a compacting force is applied to the powdered material with a punch, and a solid shape is obtained. If the powdered material has poor lubricating ability, the powdered material sometimes sticks to the punch surface. This not only degrades the product quality, but also makes it necessary to clean the punch surface, thereby decreasing the yield. For this reason, a lubricant is usually added, in particular in drug manufacture. However, the lubricant is a wax with poor solubility in water. Therefore, the addition of a lubricant is undesirable when a product is consumed after dissolving in warm water, as in the case of solid milk. This is one of the reasons why solid milk is difficult to manufacture. As described above, in accordance with the present invention, an appropriate amount of free fat, which has heretofore been considered as an undesirable component, is used as a lubricant, thereby preventing the powdered milk from sticking to the punch. Furthermore, as described above, producing a compacted body of powdered milk having the adequate porosity makes it possible to obtain readily soluble solid milk that excels in shape retaining ability. Furthermore, the addition of a disintegrating agent causes the formation of sediment, but in the method for manufacturing solid milk in accordance with the present invention, the disintegrating agent is unnecessary. Therefore, this problem can be effectively resolved.

Ambient temperature in the compacting process is not limited, and the process can be carried out at room temperature. More specifically, the ambient temperature in the compacting process is, for example, 10° C. to 30° C. Humidity in the compacting process can be, for example, 30% RH to 50% RH. It is preferred that the powdered milk compaction operation be conducted continuously in the compacting process.

2.2. Humidification Process.

The humidification process is conducted to wet the compacted body of powdered milk obtained in the compacting process. Wetting the compacted body of powdered milk partially dissolves and bridges together the particles located close to the surface of the compacted body of powdered milk. As a result, the strength close the surface of the compacted body of powdered milk is increased.

In the humidification process, the compacted body of powdered milk can be wetted with humidification means for wetting the compacted body of powdered milk. Examples of humidification means include well known humidification means such as a high-humidity chamber, a sprayer, and steam. Furthermore, a method of placing in a high-humidity environment, a method of spraying water with a sprayer, and a method of blowing steam can be employed as the humidification means. Humidity of the high-humidity environment is, for example, 60% RH to 100% RH, preferably 80% RH to 100% RH, more preferably 90% RH to 100% RH. The duration of treatment under the high-humidity environment is, for example, 5 sec to 1 h, preferably 10 sec to 20 min, more preferably 15 sec to 15 min. The temperature in the method of placing under high-humidity environment is, for example, 30° C. to 100° C., preferably 40° C. to 8° C.

The amount of moisture (also referred to below as "humidification amount") added to the compacted body of powdered milk may be appropriately adjusted. However, in accordance with the present invention, because substantially only powdered milk is used as an ingredient, the humidification amount is desirably within the following range, as indicated in the below-described embodiments (Embodiment 5) and shown in FIG. 3. Thus, if the humidification amount is set to 0.5%, the tablet hardness increases, and if the humidification amount is set to 1%, the tablet hardness almost doubles. Thus, the tablet hardness tends to increase with the increase in the humidification amount. On the other hand, when the humidification amount is 2.5% or higher, the increase in tablet hardness is stopped. Furthermore, if the humidification amount is 3% or higher, the compacted body of powdered milk dissolves and deforms or sticks to equipment during transportation. Accordingly, the amount of moisture added to the compacted body of powdered milk is preferably 0.5% to 3%, more preferably 1% to 2.5% the weight of the compacted body of powdered milk.

2.3. Drying Process

The drying process is conducted to dry the compacted body of powdered milk that was humidified in the humidification process. Because the compacted body of powdered milk that was humidified in the humidification process is dried in the drying process, surface tackiness is eliminated and the solid milk can be handled as a product. Well-known methods capable of drying the compacted body of powdered milk that was humidified in the humidification process can be employed as drying methods in the drying process. Examples of suitable methods include a method of placing under a low-humidity and high-temperature atmosphere and a method of bringing into contact with dry air or high-temperature dry air.

"Humidity" in the method involving placing under a low-humidity and high-temperature atmosphere is, for example, 0% RH to 30% RH, preferably 0% RH to 25% RH, more preferably 0% RH to 20% RH. It is thus preferred that humidity be set to as low a level as possible. "Temperature" in the method involving placing under a low-humidity and high-temperature atmosphere is, for example, 20° C. to 150° C., preferably 30° C. to 100° C., more preferably 40° C. to 80° C. "Drying time" in the method involving placing under a low-humidity and high-temperature atmosphere is, for example, 0.2 min to 2 h, preferably 0.5 min to 1 h, more preferably 1 min to 30 min.

As described above, if the moisture content of solid milk is increased, shape retaining ability thereof is degraded, and if the moisture content is low, the solid milk become brittle. For this reason, in the drying process, the moisture content ratio of the solid milk is controlled to be no more than 1% (more preferably 0.5%) higher or lower than the moisture content ratio of the powdered milk used as the ingredient.

3. Method for Manufacturing Powdered Milk and Solid Milk

The method for manufacturing powdered milk and solid milk in accordance with the present invention comprises a process of manufacturing the powdered milk and a process of manufacturing the solid milk by using the powdered milk as an ingredient. Part of the powdered milk manufactured in the process for manufacturing the powdered milk can be placed as is in a container and used as a product. In this way, powdered milk and solid milk can be obtained.

3.1. Method for Manufacturing Powdered Milk

Specific features of methods for the manufacture of powdered milk differ depending on the type of product such as modified milk represented by whole powdered milk, defatted powdered milk, and powdered milk for infants. However, basically, powdered milk can be manufactured by a process comprising the following steps: "ingredient (adjustment) →clearing sterilization→concentration→(homogenization) →spray drying→sieving→filling". The size of powdered milk after spray drying is about 5 μm to 150 μm, and the size of the granulated powdered milk is about 100 μm to 500 μm. Furthermore, after the powdered milk is mixed with granules thereof, the pores obtained have a size of about 5 μm to 150 μm.

Milk is used as an ingredient for powdered milk. Fresh milk can be used as the milk. More specifically, milk of cows (Holstein cows, Jersey cows, and the like), goats, sheep, and buffalos can be used. The content ratio of fat in the milk can be adjusted by removing part of the fat by centrifugal separation or the like. Furthermore, the below-described nutritional components can be added. On the other hand, when a modified powdered milk is manufactured, the below-described nutritional components are used upon adding to water and mixing.

Powdered milk can be manufactured by treating the aforementioned liquid ingredient, starting material, by processes of "clearing", "sterilization", "homogenization", "concentration", "spray drying", "sieving", and "filling".

Milk proteins and milk protein fractions such as casein, whey proteins (α-lactoalbumin, β-lactoalbumin, and the like), whey protein concentrate (WPC), and whey protein isolate (WPI); animal proteins such as egg protein; vegetable proteins such as soybean protein and wheat protein; peptides of various chain length obtained by decomposing those proteins with enzymes or the like; and amino acids such taurine, cystine, cysteine, alginine, and glutamine can be used individually or in mixtures as proteins serving as ingredients for powdered milk.

Milk fat, lard, animal oils and fats such as beef tallow and fish oil, vegetable oils such as soybean oil, rapeseed oil, corn oil, coconut oil, palm oil, palm kernel oil, safflower oil, cotton seed oil, linseed oil, and MCT, fractionated oils, hydrogenated oils, and transesterified oils thereof can be used individually or in mixtures as oils and fats serving as ingredients for powdered milk.

Milk sugar, cane sugar, grape sugar, malt sugar, oligosaccharides such as galacto-oligosaccharides, fructo-oligosaccharides, and lactulose, polysaccharides such as starch, soluble polysaccharides, and dextrin, and artificial sweeteners can be used individually or in mixtures as sugars serving as ingredients for powdered milk.

Furthermore, water-soluble and fat-soluble vitamins, minerals, spices, and flavors can be added as ingredients for powdered milk.

3.1.1. Clearing Process

The clearing process serves to remove fine foreign matter contained, e.g., in the cow milk by well-known means such as a centrifugal separator or a filter.

3.1.2. Sterilization Process

The sterilization process serves to kill microorganisms such as bacteria that are contained, e.g., in the milk. Sterilization temperature and holding time of the sterilization process differ depending on the type of powdered milk, and conditions relating to well-known sterilization treatment can be employed.

3.1.3. Concentration Process

The concentration process is any process for concentrating, e.g., the cow milk in advance prior to the below-described spray drying process; well-known means such as vacuum evaporation tank and conditions can be employed for the concentration process.

3.1.4. Homogenization Process

The homogenization process is any process for homogenizing the solid components such as fat globules dispersed in the cow milk. Well-known means such as causing a liquid, which is to be treated, to pass through a narrow gap under a high applied pressure and conditions can be used in the homogenization process.

3.1.5. Spray Drying Process

The spray drying process serves to obtain a powder by evaporating water present in the condensed milk. Well known means such as a spray drier and well-known conditions can be employed in the spray drying process.

3.1.6. Sieving Process

The sieving process serves to remove particles with a large diameter such as powder aggregates by passing the powder obtained in the spray drying process through a sieve, thereby adjusting the particle size of the powder.

3.1.7. Filling Process

The filling process serves to fill a bag or can with the powdered milk.

In the method for manufacturing powdered milk and solid milk in accordance with the present invention, after the powdered milk has been manufactured in the above-described manner, the above-described method for manufacturing solid milk can be employed. Thus, the above-described compacting process may be carried out by using as an ingredient the powdered milk that passed through the above-described sieving process.

4. Method for Using the Solid Milk

The solid milk in accordance with the present invention is generally dissolved in warm water and drunk. More specifically, warm water is poured into a container provided with a lid and then the necessary number of pieces of the solid milk in accordance with the present invention is placed therein. It is preferred that the solid milk be rapidly dissolved by lightly shaking the container and drunk in a state with an appropriate temperature.

The embodiments are described below and specific features of the present invention are explained. However, the present invention is not limited to those embodiments. First, methods for evaluating each evaluation item in the embodiments will be explained below and then reference examples and embodiments will be described.

Test 1. (Measurement of Solid Milk Porosity)

The porosity of solid milk was found by the following formula.

$$Porosity(\%) = (1 - W/PV) \times 100$$

W: weight of solids (g);
P: density of solids measured by using a Beckman air-type density meter (g/cm$^3$);
V: volume calculated by measuring the diameter and thickness of solids with a micrometer (cm$^3$).

Test 2 (Measurement of Free Fat Content Ratio)

The free fat content ratio was measured in the following manner. First, the solid milk was finely ground with a cutter, this was done so as not to grind it down entirely (grinding process). Then, the ground solid milk was passed through a 32 mesh sieve (sieving) process. The milk that passed through the sieve and the sieving process was used as a sample, and the content ratio of free fat was measured by the method described in "Determination of Free Fat on the Surface of Milk Powder Particles", Analytical Method for Dry Milk Products, A/S NIRO ATOMIZER (1978). The content ratio of free fat determined by this method was represented by wt % of the fat extracted with carbon tetrachloride under shaking at constant rate within the prescribed time.

Test 3 (Measurement of Tablet Hardness)

The tablet hardness of solid milk was measured with a hardness tester manufactured by Fujiwara Seisakusho Co. Thus, a load was applied in the direction in which the surface area of the fracture surface of the sample became minimal and the load at the time of fracture was measured.

Test Example 4 (Solubility Measurement)

The solubility of the solid milk was measured in the following manner. First, 100 mL of water was placed into a glass container having a capacity of 200 mL and equipped with a lid and the temperature was set to 50° C. One piece of solid milk was placed into the water, immediately followed by shaking, and the time required for the complete dissolution of solid milk was measured. Shaking conditions were as follows: 1.5 reciprocal movements per 1 sec with an amplitude of 30 cm.

Test Example 5 (Floating Oil Measurement)

The floating oil (oil-off) was measured in the following manner. First, 50 mL of water at a temperature of 50° C. was prepared in a beaker with a capacity of 100 mL. One piece of solid milk was placed into the water and completely dissolved. The solution was allowed to stay for 2 h and the presence of oil drops was then visually evaluated.

Test Example 6 (Peroxide Value Measurement)

The peroxide value was measured in the following manner. Hot water at a temperature of 60° C. to 70° C. was added to a sample and an emulsion was obtained by thorough mixing and dissolution. An aqueous solution of a nonionic surfactant (polyoxyoctylphenol ether) and sodium tripolyphosphate was added to the emulsion and emulsification was terminated, followed by the separation into an oil layer and a water layer by centrifugal separation. The oil layer was taken out and measurements were conducted by an iodine titration method (Japan Oil Chemists' Society, Standard method for Oil and Fat Analysis and Testing, Peroxide Value (Chloroform Method). The value measured by this method was represented by a miliequivalent value of iodine separated when potassium iodide was added to the sample, this value corresponding to 1 kg of the sample, and was used as an indicator of oxidation and deterioration of lipids.

Test Example 7 (Taste Test)

In the taste test, a sample was dissolved in water at a temperature of 50° C. so as to obtain a concentration of 14 wt % and the solution was drunk by a panel of 10 people. Each sample was evaluated based on a 7-grade scale and assigned with numbers from 1 to 7 based on tastefulness thereof (4 being the central value representing the usual taste) and the evaluation was conducted by the average value.

Reference Example 1

Manufacture of Powdered Milk

Liquids obtained by adding sugars, proteins, milk, and minerals to water and mixing were treated in a sequence of processes including homogenization, concentration, and spray drying to manufacture powdered milk of various compositions.

Embodiment 1

Relationship Between Compacting Force and Porosity, Solubility, Hardness

Figure 1:
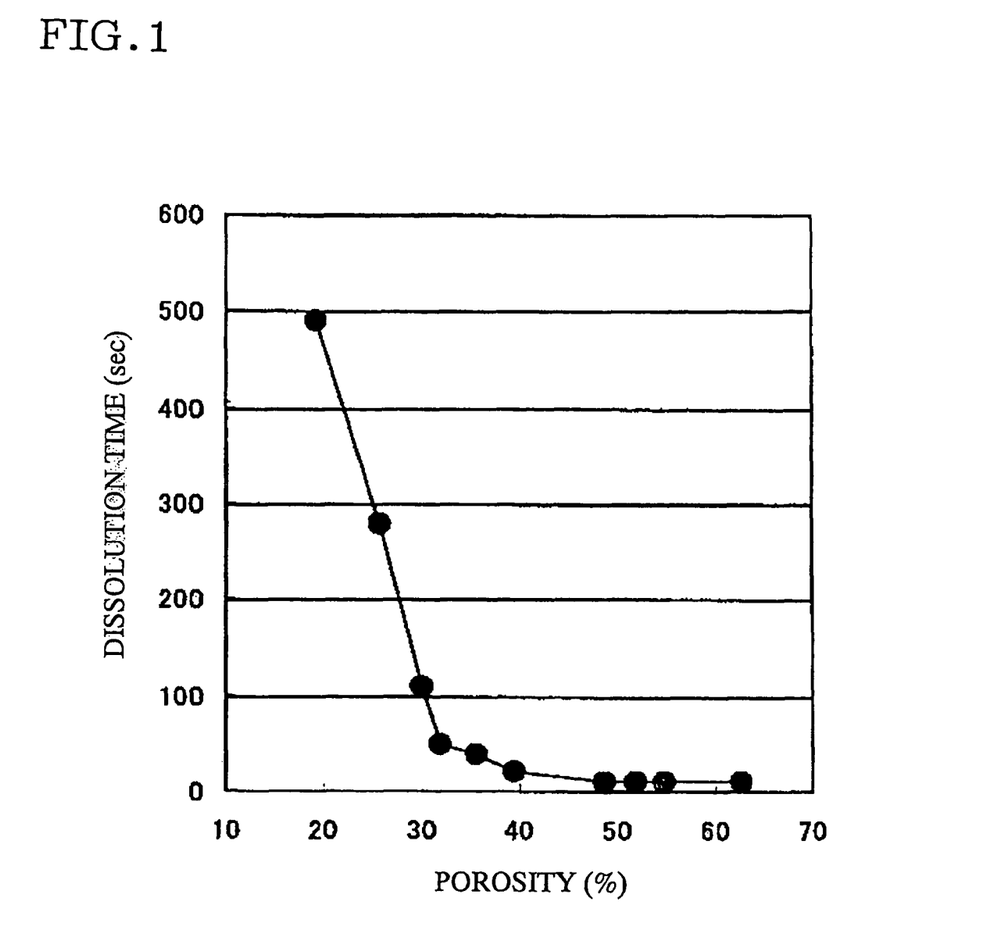
FIG. 1 is a graph illustrating the relationship between the porosity and dissolution time in Embodiment 1.
Figure 2:
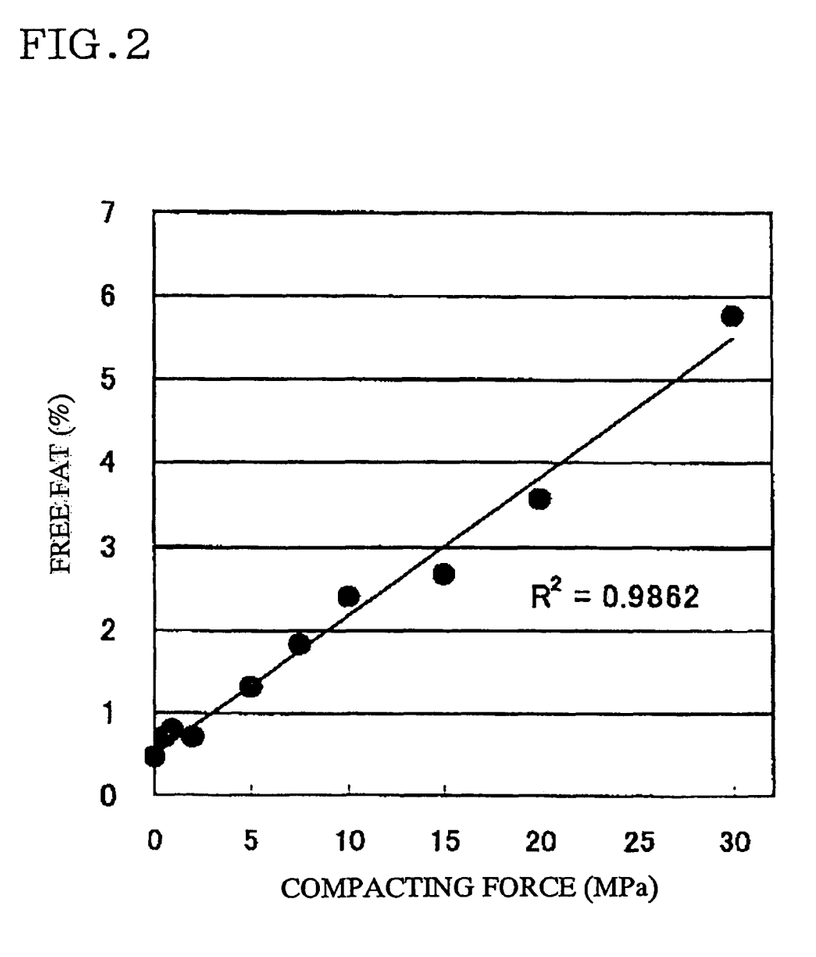
FIG. 2 is a graph illustrating the relationship between the compacting force and free fat in Embodiment 1.

The powdered milk obtained by the manufacturing method of the reference example (fats 25 wt %, sugars 58.3 wt %, proteins 11.7%, balance minerals and water) was compaction molded with a universal test autograph (manufactured by Shimazu Seisakusho Co.) under a compacting force of 0.5 MPa to 30 MPa and a punch lowering speed of 10 mm/min. The compacted milk was then allowed to stay for 5 min under conditions of 40° C. and 95% RH in a thermostat with a constant humidity level (manufactured by TABAI ESPEC Co.). Then, it was dried for 30 min at 40° C. with an air oven (manufactured by Yamato Kagako Co.). A piece of solid milk with a diameter of 25 mm and a weight of about 5 g was thus obtained. The powdered milk used as an ingredient and the solid milk obtained herein were evaluated according to Test Examples 1 to 5. The results are shown in Table 1. Of the data shown in Table 1, the relationship between the porosity and dissolution time is shown in FIG. 1. Of the data shown in Table 1, the relationship between the compacting force and free fat is shown in FIG. 2.

TABLE 1

Compacting force and state of solid milk

| | Compacting force (MPa) | | | | | | | | | |
|---|---|---|---|---|---|---|---|---|---|---|
| | 0 | 0.5 | 1 | 2 | 5 | 7.5 | 10 | 15 | 20 | 30 |
| Porosity (%) | 62.7 | 54.8 | 51.9 | 48.6 | 39.5 | 35.4 | 31.8 | 30.1 | 25.7 | 19.3 |
| Free fat (%) | 0.46 | 0.69 | 0.77 | 0.69 | 1.29 | 1.80 | 2.39 | 2.66 | 3.57 | 5.75 |
| Hardness prior to humidification (N) | 0 | 1.5 | 5.1 | 8.2 | 32.9 | 53.3 | 68.6 | 83.8 | 116.5 | 181.7 |
| Hardness (N) | — | 18.3 | 30.2 | 40.3 | 81.8 | 106.0 | 140.3 | 154.4 | 185.3 | 291.0 |
| Rapid solubility (sec) | 10 | 10 | 10 | 10 | 20 | 40 | 50 | 110 | 278 | 490 |
| Oil off (-) | − | − | ± | ± | ± | ± | ± | − | + | + |

Oil off evaluation
− No floating substance
± Fine floating substance with a size (0.5 mm or less) creating no problems in practical use were observed
+ Floating substance in the form of oil drops was observed (0.5 mm or more)

FIG. 1 shows that there is a correlation between the porosity and dissolution time. Furthermore, FIG. 1 shows that the dissolution time changes rapidly when the porosity is close to 30%. A practical dissolution time of solid milk that is drunk upon dissolution is preferably within 120 sec, more preferably within 60 sec. The solid milk with a porosity of 25.7% (compacting force 20 MPa) required 278 sec (about 4.6 min) for dissolution. Therefore, this solid milk is not suitable for practical use. The solid milk with a porosity of 30.1% (compacting force 15 MPa) dissolved in 110 sec. Furthermore, the solid milk with a porosity of 31.8% (compacting force 10 MPa) dissolved in 50 sec. Therefore, from the standpoint of solubility, it is preferred that the porosity be 30% or higher and the compacting force be 15 MPa or less.

Table 1 shows that if the compacting force exceeds 20 MPa, oil droplets are observed on the water surface, raising the oil-off problem. Oil-off was found to cause no practical problems when the compacting force was 15 MPa or less. Thus, from the standpoint of oil-off, it is preferred that the porosity be 30% or higher and the compacting force be 15 MPa or less.

Furthermore, FIG. 2 shows that there is a correlation between the compacting force and the amount of generated free fat and that the amount of free fat can be controlled by controlling the compacting force. Furthermore, at a porosity of 50% or higher, the hardness of the compaction molded body prior to humidification and drying is low and the molded body is difficult to transfer to the subsequent step.

The tablet hardness of the compaction molded body is also increased by humidification and drying processes. The tablet hardness necessary for distribution and handling by the user is about 30 N and it can be attained by molding with a compacting force of 1 MPa, humidification, and drying.

It is clear that compaction conditions of a porosity of 30% to 50% and a compacting force of 1 MPa to 15 MPa are suitable for evaluating flowability, tablet hardness before and after humidification and drying, and oil-off.

Embodiment 2

Using Milk in the Form of Powder and Granules with Different Fat Content

Solid milk pieces with a diameter of 25 mm and a weight of about 5 g were obtained by the processes and under conditions identical to those of Embodiment 1, except that the powdered milk with a fat content of 5% to 40% was molded with a compacting force of 5 MPa. The pieces were evaluated according to Test Examples 1 to 5. the results are shown in Table 2. The oil-off evaluation item was the same as in Embodiment 1.

TABLE 2

Content of fat and state of solid milk

| | | Fat content ratio (%) | | | | | |
|---|---|---|---|---|---|---|---|
| | | 5 | 10 | 18 | 25 | 30 | 40 |
| Powdered milk as ingredient | Shape | Granules | Granules | Granules | Granules | Powder | Powder |
| | Free fat (%) | 0.03 | 0.28 | 0.46 | 0.46 | 1.33 | 1.48 |
| Molded product | Porosity (%) | 45.0 | 42.2 | 41.5 | 39.5 | 36.3 | 31.0 |
| | Free fat (%) | 0.11 | 0.51 | 0.84 | 1.29 | 3.02 | 3.93 |
| | Hardness prior to humidification (N) | 0 | 4.2 | 12.5 | 32.9 | 17.4 | 30.0 |
| | Hardness (N) | 18.1 | 17.6 | 46.0 | 81.8 | 25.9 | 83.0 |
| | Rapid solubility (sec) | 30 | 20 | 30 | 20 | 40 | 50 |
| | Oil off (-) | − | − | ± | ± | − | ± |

When the powdered milk with a fat content of 5% was used, the compaction molded body (free fat 0.11%) before the humidification and drying treatment had a very low hardness and was difficult to transfer to the next process. When the powdered milk with a fat content of 10% or higher was used, compaction molded bodies with good properties were obtained, regardless of the presence of the granulation stage.

Thus, the powdered milk containing a certain amount of fat makes it possible to obtain compaction molded bodies combining hardness with solubility, which are reciprocal properties, without the addition of special additives, by adjusting the compacting force, porosity, and free fat amount to the ranges limited by the present invention.

Embodiment 3

Effect of Free Fat

The results obtained in Embodiment 2 showed that when the powdered milk with a fat content of 5% was used, the compaction molded body before humidification and drying treatment had a very low hardness. The augmenting effect of free fat on hardness was studied by adding (i) 0.5 wt %, (ii) 1.0 wt %, and (iii) 2.0 wt % butter oil (manufactured by Corman Co.) to the powdered milk comprising 5% fat and conducting the compaction molding under the conditions described in Embodiment 2. The results are shown in Table 3.

TABLE 3

Amount of fat added and state of solid milk

| | Amount of butter oil added (%) | | | |
|---|---|---|---|---|
| | 0 | 0.5 | 1 | 2 |
| Porosity (%) | 45.9 | 45.6 | 45.6 | 44.7 |
| Hardness prior to humidification ①(N) | 0 | 0 | 0 | 0 |
| Hardness prior to humidification ②(N) | 0 | 7.2 | 7.3 | 7.3 |

① Compaction molding immediately after the addition of butter oil
② Butter oil is added, and compaction molding is conducted after storing for 2 days in a sealed container When compaction molding was conducted immediately after adding the butter oil, hardness was very low in all the cases, but when compaction molding was conducted after 2 days, a hardness of about 7 N was obtained. When no butter oil was added, a very low hardness was obtained regardless of the stay interval. Because no significant difference in porosity of the compaction molded bodies was observed, it is clear that the addition of oil acted to augment the shape retention ability.

The above-described results suggest that if fat is added, it does not merely contribute to the increase in hardness, but the fat that penetrated from the surface of powdered milk particles into inner zones thereof with the passage of time and is present therein acts to augment the hardness. When a solid fat that is in a wax-like form at room temperature (palm hardened oil, melting point 58° C., manufactured by Oya Yushi K. K.) was added instead of the butter oil, which is a liquid at room temperature, the hardness increase effect was not obtained.

Solid fat (wax) is generally known to demonstrate a lubricating action reducing friction during compaction molding and has been widely used for this purpose. However, when compaction molding under a low pressure is required to ensure cavities, as in accordance with the present invention, the fat effectively acts both to impart lubricating properties and augment the shape retention ability. Adding a fat that is liquid at room temperature is effective for this purpose, but because an additional process is required and the flow-ability of the powder having a liquid fat added thereto decreases and die filling accuracy also decreases, a very effective approach is to free the fat that has originally been present in powdered milk from the emulsified product in an amount necessary for compaction molding.

Embodiment 4

Ensuring Productivity

The powdered milk obtained by the manufacturing method of the reference example (fats wt %, sugars 58.3 wt %, proteins 11.7%, balance minerals and water) was continuously compaction molded for 1 h under the conditions of a compacting force of 5 MPa and a rate of 20 pieces/min (1200 pieces/h) in a single-punch tablet machine (manufactured by Okada Seiko Co.), Then, the moldings were allowed to stay for 5 min under conditions of 40° C. and 95% RH in a thermostat with a constant humidity level (manufactured by TABAI ESPEC Co.) and dried for min at a temperature of 40° C. in an air oven (Yamato Kagaku K. K.) to obtain solid milk with a diameter of 25 mm and a weight of about 4.2 g.

In continuous making tablets for 1 h, damage for making tablets caused by the powder sticking to the die and punch was not observed and the operation was not interrupted. The results of continuous tablet test are shown in Table 4. The compacted molded body had a hardness of 10 N and no troubles, such as loss of shape, were encountered when it was transferred to the humidification process. The solubility of the solid milk body manufactured via the drying process was within 30 sec and this body had a sufficient tablet hardness of 92.5 N. No oil-off was observed and the taste was not different from that of the powdered milk used as an ingredient. The porosity of the solid milk body was 36.3% and the content ratio of free fat was 0.54%.

TABLE 4

Continuous tablet test

| | Powdered milk of ingredient | Solid milk |
|---|---|---|
| Porosity (%) | — | 36.3 |
| Hardness prior to humidification (N) | — | 10.0 |
| Hardness (N) | — | 92.5 |
| Rapid solubility (sec) | 10 | 30 |
| Free fat (%) | 0.09 | 0.54 |
| Oil off (-) | — | — |
| Taste (-) | 4.10 | 4.10 |

Embodiment 5

Study of Humidification Conditions

Humidification conditions were studied by using as a sample a compaction molded body (diameter 27 mm, weight about 7 g) obtained by compaction molding the powdered milk (fats 25 wt %, sugars 58.3 wt %, proteins 11.7%, balance minerals and water) with a universal test autograph (manufactured by Shimazu Seisakusho Co.) under a compacting force of 5 MPa and a compaction rate of 10 mm/min.

Figure 3:
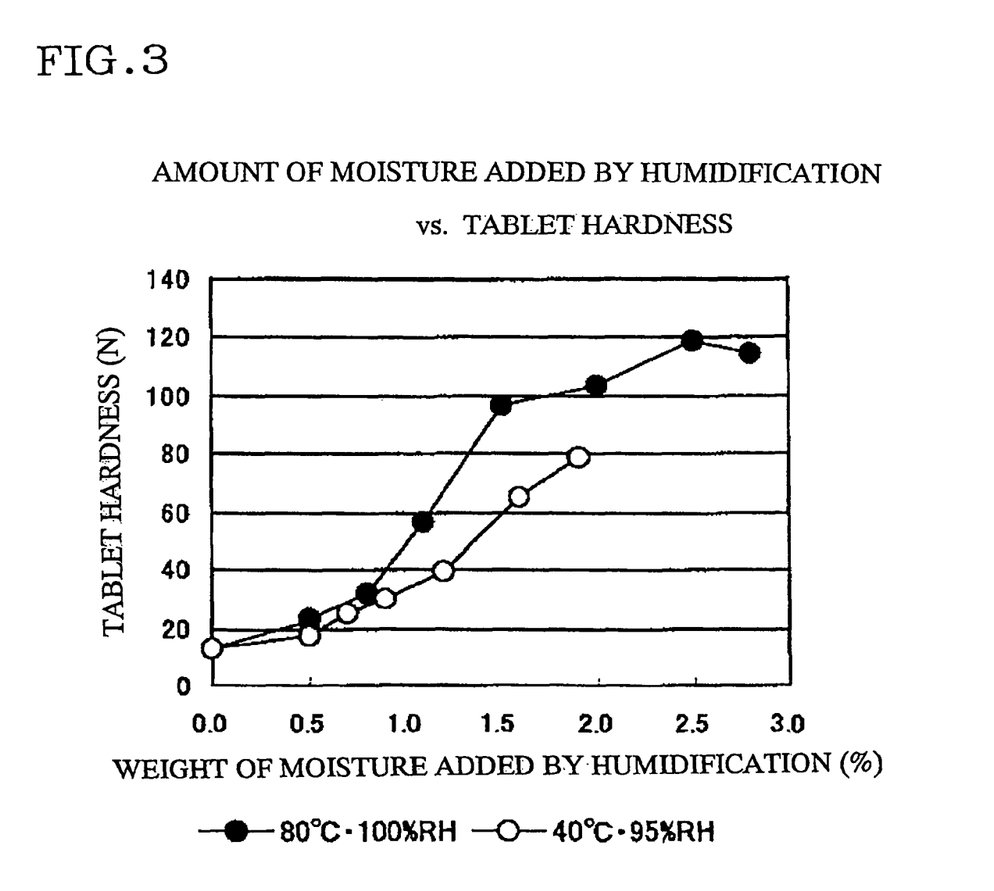
FIG. 3 is a graph illustrating the relationship between the humidification time and tablet hardness in Embodiment 5.
Figure 4:
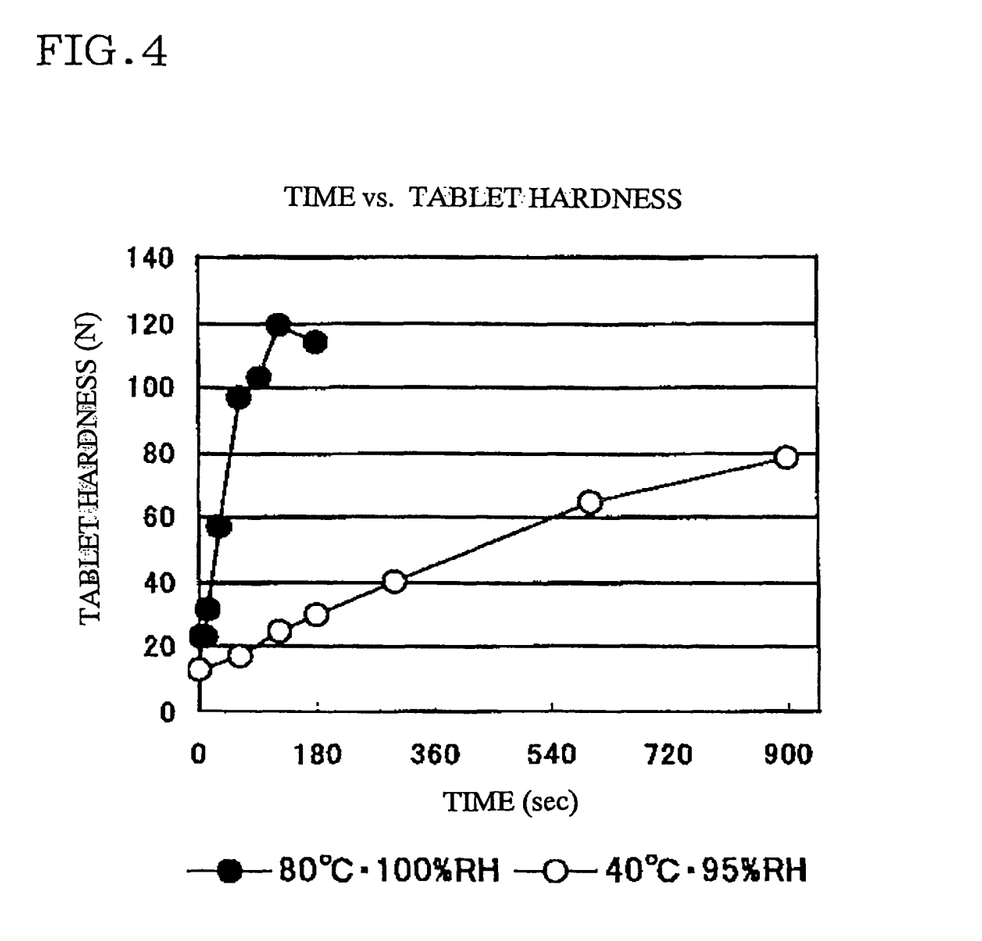
FIG. 4 is a graph illustrating the relationship between the and amount of moisture added by humidification and tablet hardness in Embodiment 5.

The sample was then allowed to stay for a fixed time at 80° C. and 100% RH (combination oven, manufactured by Fujimach Co.) or 40° C. and 95% RH (thermostat with a constant humidity level, manufactured by TABAI ESPEC Co.) and the weight of moisture added by humidification was found by measuring the weight before and after the humidification. Then, drying was conducted for 30 min at a temperature of 40° C. in an air oven (manufactured by Yamato Kagaku Co.) and the tablet hardness was measured. The relationship between the humidification time and tablet hardness found in Embodiment 5 is shown in FIG. 3, and the relationship between the amount of moisture added in humidification and tablet hardness found in Embodiment 5 is shown in FIG. 4. Furthermore, the relationships between humidification time at 80° C. and 100% RH (combination oven) and 40° C. and 95% RH (thermostat with a constant humidity level), weight change in humidification (%), and hardness (N) after drying are shown in Table 5-1 and Table 5-2, respectively.

TABLE 5-1

Conditions: temperature 80° - 100% RH

| | Humidification time (sec) | | | | | | | | |
|---|---|---|---|---|---|---|---|---|---|
| | 0 | 5 | 10 | 15 | 30 | 60 | 90 | 120 | 180 |
| Humidification weight (%) | 0 | 0.5 | 0.5 | 0.8 | 1.1 | 1.5 | 2 | 2.5 | 2.8 |
| Hardness after drying (N) | 12.7 | 22.5 | 23 | 31.3 | 56.5 | 96.7 | 103 | 119 | 114 |

TABLE 5-2

Conditions: temperature 40° - 95% RH

| | Humidification time (sec) | | | | | | |
|---|---|---|---|---|---|---|---|
| | 0 | 60 | 120 | 180 | 300 | 600 | 900 |
| Weight of moisture added by humidification (%) | 0 | 0.5 | 0.7 | 0.9 | 1.2 | 1.6 | 1.9 |
| Hardness after drying (N) | 12.7 | 17.3 | 25 | 29.5 | 39.5 | 64.8 | 78.2 |

FIG. 3 shows that the tablet hardness increase effect is demonstrated with a 0.5 wt % humidification. Furthermore, with about 1 wt % humidification, the tablet hardness is almost doubled and the tablet hardness tends to increase with the increase in the weight of moisture added by humidification. If the weight of moisture added by humidification exceeds 2.5 wt %, no further increase in the tablet hardness is observed. Furthermore, FIG. 4 shows that the humidification process can be completed within a shorter time if the treatment is conducted at a high temperature.

Embodiment 6

Long-Term Storage Ability

The solid milk manufactured under a compacting force of 5 MPa of Embodiment 1 and the powdered milk used as an ingredient were placed in aluminum packages and stored for 3 months at a temperature of 30° C. and the dissolution time, tablet hardness, free fat, peroxide value, oil-off, and taste were examined following the test example. The results are shown in Table 6. From Table 6 it follows that the dissolution time, tablet hardness, free fat, oil-off, and taste after the storage were identical to the initial values at the time of manufacture. The peroxide value was about the same as that of the powdered milk used as an ingredient. The results described above demonstrate that the solid milk obtained by the manufacturing method in accordance with the present invention has excellent long-term storage ability.

TABLE 6

Long-term storage ability at a temperature of 30° C.

| | Tablet | | Powdered milk (ingredient) | |
|---|---|---|---|---|
| Test item | Initial | After 3 months | Initial | After 3 months |
| Free fat (%) | 1.28 | 1.39 | 0.54 | 0.59 |
| Peroxide value (meq/kg) | 0.08 | 0.95 | 0.12 | 0.78 |
| Oil off (-) | ± | ± | ± | ± |
| Taste (-) | 4.08 | 4.09 | 4.00 | 3.91 |
| Dissolution time (sec) | 30 | 30 | | |
| Tablet hardness (N) | 42 | 43 | | |

Because it is clear that a marketable product can be produced when the solid milk in accordance with the present invention is actually manufactured, the solid milk and the method for the manufacture thereof in accordance with the present invention can be employed in food industry as a replacement for powdered milk and a method for the manufacture thereof.

What is claimed is:

1. A method for manufacturing solid milk, comprising, in the following order:
    a compacting process for compacting powdered milk and obtaining a solid compacted body of powdered milk;
    a humidifying process for wetting the compacted body of powdered milk obtained in said compacting process; and
    a drying process for drying the compacted body of powdered milk humidified in said humidification process,
    wherein an amount of moisture added to the compacted body of powdered milk in the humidifying process is 0.5% to 3%,
    wherein the content of free fat in the compacted body of powdered milk in the drying process is 0.5 wt % to 4 wt %,
    and wherein the powdered milk used in said compacting process has a total fat content of 5 wt % or higher.

2. The method for manufacturing solid milk according to claim 1, wherein substantially no additives are added to the ingredient in said compacting process.

3. The method for manufacturing solid milk according to claim 1, wherein the compacting force is controlled in said compacting process so that the porosity of the compacted body of powdered milk becomes 30% to 50%.

4. The method for manufacturing solid milk according to claim 1, wherein the compacting force for compacting the powdered milk in said compacting process is 1 MPa to 15 MPa.

5. The method for manufacturing solid milk according to claim 1, wherein in said drying process, the moisture content of the solid milk is controlled to be no more than 1% higher or lower than the moisture content of the powdered milk used as the ingredient.

* * * * *